United States Patent
Vago

(10) Patent No.: US 6,612,301 B2
(45) Date of Patent: Sep. 2, 2003

(54) WATER HEATER

(75) Inventor: Otto Z. Vago, Burns, TN (US)

(73) Assignee: State Industries, Inc., Nashville, TN (US)

(*) Notice: Subject to any disclaimer, the term of this patent is extended or adjusted under 35 U.S.C. 154(b) by 0 days.

(21) Appl. No.: 09/849,757

(22) Filed: May 4, 2001

(65) Prior Publication Data

US 2001/0027756 A1 Oct. 11, 2001

Related U.S. Application Data

(63) Continuation of application No. 09/409,955, filed on Sep. 30, 1999, now abandoned.
(60) Provisional application No. 60/133,749, filed on May 12, 1999.

(51) Int. Cl.$^7$ ................................................. F24H 9/20
(52) U.S. Cl. ........................................................ 126/344
(58) Field of Search .............................. 122/13.1, 17.1, 122/18.2, 18.3, 115, 45, 16; 126/344, 350.1

(56) References Cited

U.S. PATENT DOCUMENTS

| 5,012,793 A | * | 5/1991 | Guzorek |
| 5,020,512 A | * | 6/1991 | Vago et al. |
| 5,197,665 A | * | 3/1993 | Jenson et al. |
| 5,697,330 A | * | 12/1997 | Yetman et al. |
| 5,941,200 A | * | 8/1999 | Boros et al. |
| 6,112,741 A | * | 9/2000 | Stickford et al. |

FOREIGN PATENT DOCUMENTS

| DE | 3225387 | * | 1/1983 | ................ 122/18.2 |
| EP | 0109620 | * | 5/1984 | ................ 122/18.2 |
| EP | 0255919 | * | 2/1988 | ................ 122/18.2 |
| GB | 2176272 | * | 12/1986 | ................ 122/18.2 |
| NL | 7 603 212 | | 9/1977 | |

* cited by examiner

Primary Examiner—Carl D. Price
(74) Attorney, Agent, or Firm—Sughrue Mion, PLLC

(57) ABSTRACT

A water heater comprising a water-tight tank having a combustion chamber located in the bottom portion of the tank. A combustion air blower is operable to draw combustion air into the combustion chamber through a vertical tube in which the air flows from atmosphere downwardly into the combustion chamber. Combustion air entering the combustion chamber supports combustion of gas emanating from burners positioned in the combustion chamber. The products of combustion (flue gases) are drawn upwardly through a plurality of tubes, which extend from the combustion chamber to a flue gas collector box on the top of the water heater. From the flue gas collector box, the flue gases flow into an air/flue product mixing chamber and then out through an exit port.

4 Claims, 1 Drawing Sheet

WATER HEATER

CROSS-REFERENCE TO RELATED APPLICATIONS

This application is a continuation of copending application(s) application Ser. No. 09/409,955 filed on Sep. 30, 1999 now abandoned, and claims priority from provisional application Ser. No. 60/133,749, filed May 12, 1999.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

This invention relates to a water heater and more specifically to a gas-fired water heater having a relatively high BTU rating for use in commercial versus residential applications. This does not mean that the water heater construction of the present invention would not have utility as a residential water heater.

BRIEF SUMMARY OF THE INVENTION

A water heater having a watertight tank, a combustion chamber below the tank and a gas burner mounted in the combustion chamber for heating the water in the tank. A combustion air inlet tube carries combustion air downwardly from the top of the heater to the combustion chamber. A plurality of flue tubes extend from the combustion chamber to a flue collector box at the top of the heater. A combustion air blower is provided to draw air downwardly through the inlet tube to the combustion chamber. The blower further operates to drawn flue gases upwardly through the flue tubes for discharge from the water heater.

DETAILED DESCRIPTION OF THE INVENTION

Figure 1:
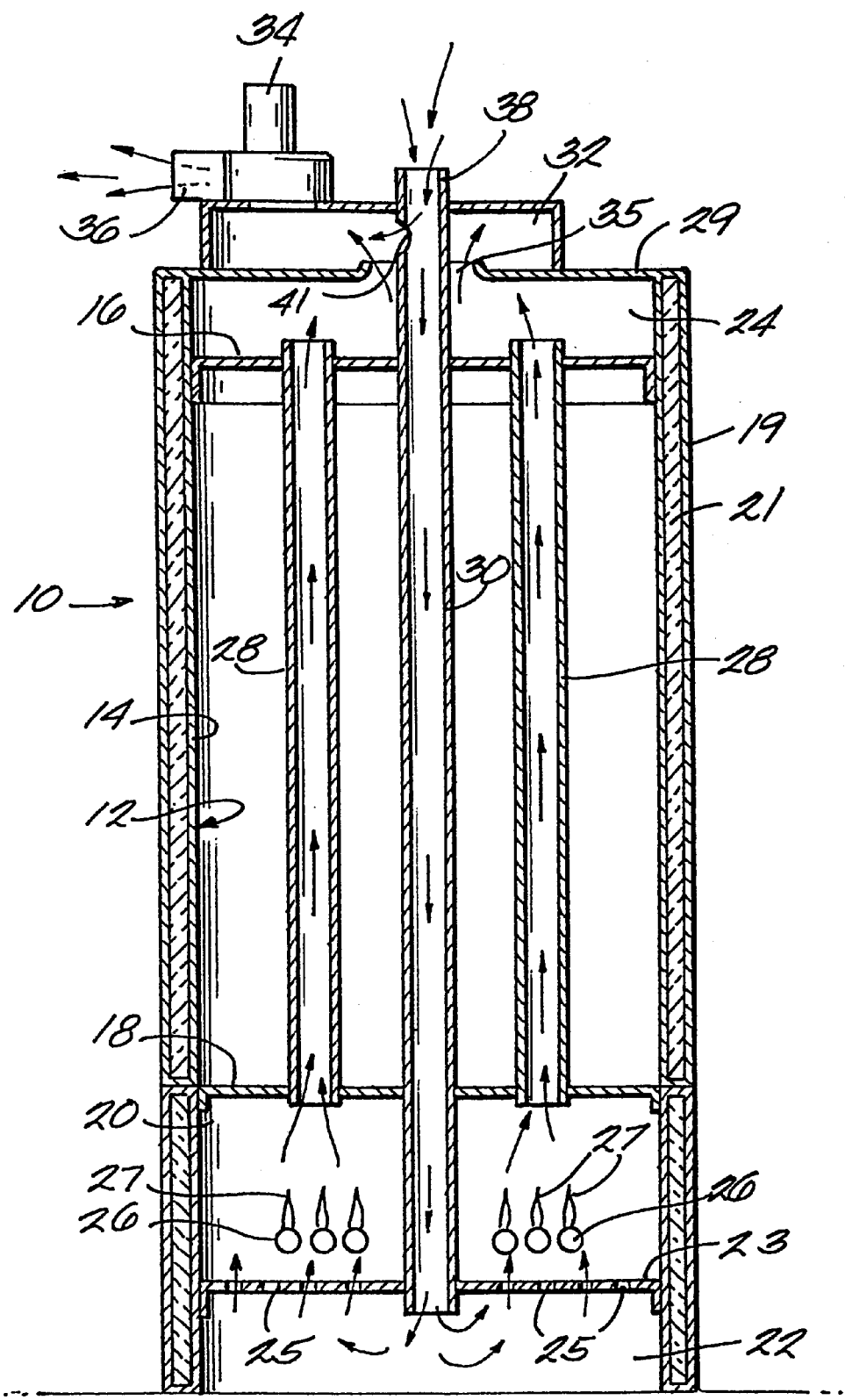
FIG. 1 is a side elevation schematic view of a water heater embodying the invention of the present application.

Referring to the drawing, FIG. 1 shows a gas-fired water heater 10 including a water-tight tank 12 comprised of a shell 14 and top and bottom tank wall members 16 and 18. The water heater has an outer jacket 19 and a layer of insulation 21 between tank shell 14 and jacket 19.

A combustion chamber 20 and a combustion air distribution chamber 22 are located at the bottom of the water heater below bottom tank wall member 18. A partition wall 23 separates chamber 20 from chamber 22 and has a plurality of airflow openings 25 therein. A flue gas collector box 24 is located at the top of the water heater above top tank wall member 16.

An array of gas burners 26 are mounted in combustion chamber 20 which communicate with a source of gas by a gas delivery tube of conventional design (not shown) to produce combustion flames 27.

A plurality of flue tubes 28 are mounted in tank wall members 16 and 18 to provide sealed communication between combustion chamber 20 and flue gas collector box 24.

A centrally located combustion air inlet tube 30 provides communication between a combustion air/flue product mixing chamber 32 mounted on the top of water heater 10 and the combustion air distributor chamber 22. Multiple combustion air inlet tubes 30 located off-center of the water heater may be used. An electrically energized combustion air blower 34 is mounted at the top of air/flue product mixing chamber 32.

Blower 34 is provided with an exhaust port 36. Combustion air inlet tube 30 is provided with an inlet 38. An opening 41 in the upper end of inlet tube 30 provides communication between the upper end of tube 30 and air/flue mixing chamber 32.

OPERATION

With blower 34 energized, fresh combustion air is drawn into combustion air inlet tube 30 through inlet 38. Combustion air is drawn downwardly through tube 30 as shown by the arrows in tube 30 and exits the bottom end of tube 30 into distribution chamber 22.

Combustion air then flows upwardly from chamber 22 into combustion chamber 20 through openings 25 in partition wall 23 as shown by arrows.

The air entering chamber 20 supports combustion of the gas emanating from burners 26 as indicated by flames 27.

The products of combustion (flue gases) are drawn upwardly through tubes 28 and exit the ends of tubes 28 into flue gas collector box 24 as shown by the arrows in tubes 28.

From flue gas collector box 24, the flue gases flow into air/flue product mixing chamber 33 through the annular space 35 around air inlet tube 30 as it passes through the top wall 29 of collector box 24. From box 24, the flue gases flow out through exit port 36 of blower 34 as shown by the arrows.

A portion of the combustion air flowing into combustion air inlet tube 30 is diverted into air/flue product mixing chamber 32 through an opening 41 in the wall of combustion air inlet tube 30. It is then mixed with the flue gases entering chamber 32 through annular space 35 to thereby cool said flue gases. The mixture of fresh air and flue gases is exhausted through the exhaust port 36 of blower 34.

While the invention herein has been shown and described in what is presently conceived to be the most practical preferred embodiment, it will be obvious to one of ordinary skill in the art that many modifications may be made thereof within the scope of the invention, which scope is not to be limited except by the appended claims.

I claim:

1. A water heater comprising:
    (a) a water-tight tank (12) including a shell (14), a top wall (16) and a bottom wall (18);
    (b) a combustion air distributor chamber (22) located at the bottom of the water heater (10);
    (c) a combustion chamber (20) is located immediately above said combustion air distributor chamber (22);
    (d) a partition wall (23) is located between said combustion air distributor chamber (22) and said combustion chamber (20), said partition wall (23) having a plurality of combustion air openings (25) therein;
    (e) a gas burner means (26) is mounted inside said combustion chamber (20) operable to supply gas into said combustion chamber (20);
    (f) a flue gas collection box (24) is located at the top of the water heater;

(g) a plurality of flue tubes (28) mounted in said top and bottom tank wall members to provide sealed communication between said combustion chamber (20) and said flue gas collector box (24);

(h) an air/flue product mixing chamber (32) is mounted on the top of the water heater;

(i) at least one combustion air inlet tube (30) extending from said air/flue product mixing chamber (32) through the interior of said tank (12) to said combustion air distributor chamber (22), said combustion air inlet tube (30) operable to carry combustion air to said combustion air distribution chamber (22);

(j) a combustion air blower (34) is operable to draw combustion air into said tube (30) to establish flow of combustion air into said combustion air distributor chamber (22), then into combustion chamber (20) through openings (25) in partition wall (23), said combustion air flowing into chamber (20) supporting combustion of the gas flowing from said gas burner means (26) to thereby heat the water in said tank (12), said combustion air being preheated as it flows through said air inlet (30), said combustion of gas in said combustion chamber producing flue gases which pass upwardly through said flue tubes (28) into said flue collector box (24); and (k) a passageway means (35) communicating said flue collector box (24) with said air/flue product mixing chamber (32), said blower operable to exhaust flue gases from said chamber (32).

2. A water heater according to claim 1 in which there is an opening (41) in the wall of said combustion air inlet tube (30) through which fresh air is diverted into said air/flue product mixing chamber (32).

3. A water heater according to claim 1 in which the combustion air inlet tube (30) communicates with said combustion air blower (34) so that a portion of the combustion air flowing into tube (30) will be diverted into a air/flue product mixing chamber (32) where it will be mixed with the flue gases before the flue gases are exhausted by blower (34).

4. A water heater according to claim 1 in which there is a single combustion air inlet tube (30) located centerly of said flue tubes (28).

* * * * *

UNITED STATES PATENT AND TRADEMARK OFFICE
CERTIFICATE OF CORRECTION

PATENT NO.    : 6,612,301 B2
DATED         : September 2, 2003
INVENTOR(S)   : Otto Z. Vago It is certified that error appears in the above-identified patent and that said Letters Patent is hereby corrected as shown below:

<u>Column 2,</u>
Lines 56, 58, 62 and 65, delete "is".

<u>Column 3,</u>
Lines 5 and 13, delete "is".

Signed and Sealed this

Seventeenth Day of February, 2004

JON W. DUDAS
*Acting Director of the United States Patent and Trademark Office*

UNITED STATES PATENT AND TRADEMARK OFFICE
CERTIFICATE OF CORRECTION

PATENT NO.  : 6,612,301 B2  
DATED       : September 2, 2003  
INVENTOR(S) : Otto Z. Vago It is certified that error appears in the above-identified patent and that said Letters Patent is hereby corrected as shown below:

<u>Title page,</u>  
Item [56], References Cited, U.S. PATENT DOCUMENTS, add the following reference:  
-- 4,672,919 A * 6/1987 Staats --

Signed and Sealed this

Eighth Day of June, 2004

JON W. DUDAS  
*Acting Director of the United States Patent and Trademark Office*